Dec. 24, 1940.                D. A. ENSIGN                2,226,462
                         TROLLEY GUARD SUPPORT
                          Filed May 17, 1939

Inventor
Darwin A. Ensign,
By Stone, Boyden & Mack,
Attorneys.

Patented Dec. 24, 1940

2,226,462

UNITED STATES PATENT OFFICE 2,226,462

TROLLEY GUARD SUPPORT

Darwin A. Ensign, Huntington, W. Va., assignor to Ensign Electric and Manufacturing Company, Huntington, W. Va., a corporation of West Virginia Application May 17, 1939, Serial No. 274,287

11 Claims. (Cl. 191—30)

This invention relates to guards of flexible material for use in connection with trolley wires, where such wires are necessarily hung relatively low, as for example in mines.

With such low hung wires it is desirable to provide a guard of flexible insulating material, such as rubber and fabric sheeting, for the purpose of preventing workmen from coming in contact with the wire.

The object of the present invention is to devise a simple and practical bracket for supporting such guards, which bracket may be readily applied to existing trolley wires, regardless of the particular type of hanger employed.

In order that the invention may be readily understood, reference is had to the accompanying drawing, forming part of this specification, and in which—

Figure 1:
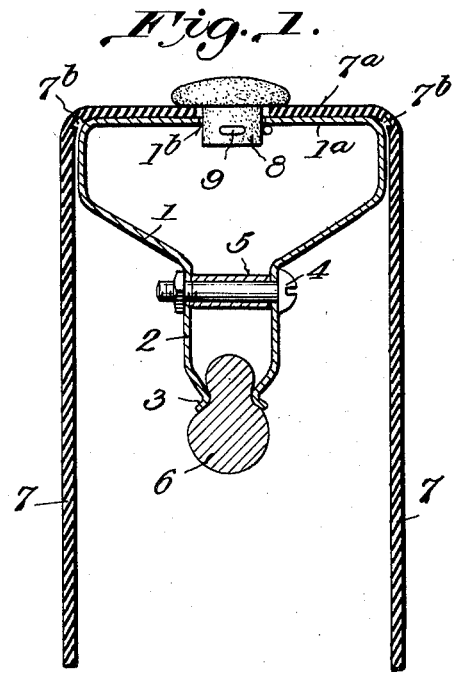
Fig. 1 is a transverse section showing one form of my improved bracket in position on a trolley wire, and supporting a guard of special construction.

Referring to the drawing in detail, and first more particularly to Fig. 1, my improved bracket comprises a band or strap 1 of sheet metal bent into the form of a loop, such loop having top and side portions with straight meeting edges. The top portion 1ª is preferably flat and of relatively great width as compared with the diameter of the trolley wire, and the sides comprise a pair of downwardly extending substantially parallel arms 2 provided at their extreme ends with rounded or outwardly turned portions 3 adapted to grip between them a trolley wire of the conventional "figure 8" pattern. The arms 2 are held together in clamping relation by means of a bolt 4 extending through the same below said inclined portions, a spacing sleeve 5 preferably surrounding the bolt between the arms so as to limit the extent to which they may be squeezed together by the bolt, thus preventing deformation of the bracket.

The guard itself is designated in its entirety by the numeral 7, and consists of a sheet of flexible insulating material such as a combination of rubber and fabric. The particular guard illustrated in Fig. 1 is of the type covered by Patent No. 2,151,099, to Groendyk, and comprises a central portion 7ª separated from the edge portions by means of grooves 7ᵇ. These grooves weaken the sheet at these points and permit it to readily bend, so that the side portions hang freely down vertically, thus forming skirts or curtains, embracing the trolley wire between them. Owing to the width of the loop of the bracket, these curtains or skirts are spaced far enough apart to permit the ready passage of the usual trolley wheel between them.

It will be understood that the central portion 7ª of the guard overlies the flat upper portion 1ª of the loop of the bracket and that the width of this central portion corresponds substantially with the width of the loop, so that the grooves 7ᵇ coincide substantially with the straight edges or corners of the loop.

The guard is secured to the brackets by means of pins or studs 8 of insulating material, passing through holes 1ᵇ in the brackets and secured in position by means of cotter pins 9 or the like.

It will be understood that my improved brackets are intended to be clamped to the trolley wire as shown, at intervals of a few feet apart, between hangers, so that the guard is effectively supported and prevented from sagging.

By virtue of the fact that the pins or studs 8, for securing the guard to the brackets, are of insulating material, there is no possibility of short circuiting or grounding the trolley wire, should these pins or studs come in contact with the roof of the mine or other conducting surface. As will be observed, the brackets themselves are entirely enclosed or housed within the insulating guard so that they also cannot come in contact with the roof or any other surface.

Figure 2:
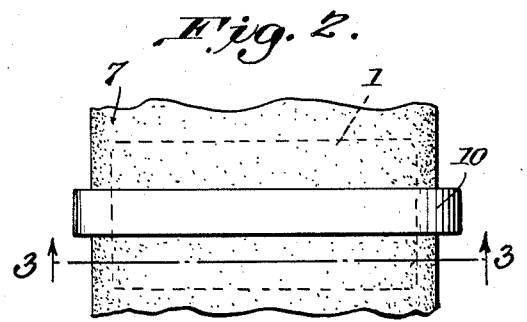
Fig. 2 is a fragmentary plan view showing my improved bracket in dotted lines, and illustrating a guard of somewhat different character, and different means for securing the guard to the bracket.
Figure 3:
Fig. 3 is a sectional view similar to Fig. 1, taken on the line 3—3 of Fig. 2, looking in the direction of the arrows.

In Figs. 2 and 3 I have illustrated a somewhat modified construction in which, instead of employing a guard sheet having grooves 7ᵇ therein, as shown in Fig. 1, I employ a plain piece of sheeting, of uniform thickness throughout. In Figs. 2 and 3, this plain sheeting or guard is indicated in its entirety by the numeral 7'.

In Figs. 2 and 3, I employ a somewhat modified type of bracket, in that, at each side of the loop, just below the flat upper portion 1ª, I provide re-entrant portions 1' forming external channels or grooves at the sides of the bracket. In order to secure the guard to the brackets, I provide a spring clip 10, formed of a relatively narrow strip of metal and having at its ends inwardly directed portions 10a, terminating at their extreme ends in outwardly turned portions 10b forming rounded edges.

After the sheet or guard has been placed over the brackets, one of these spring clips 10 is forced down over the guard at each bracket, the rounded portions 10b at the ends of the clip bearing against the outer surface of the guard and forcing the guard inwardly into the grooves 1', the guard thus being clamped between the ends of the clip 10 and the grooves in the brackets. It will be noted that the middle portion of the guard, in this arrangement, does not lie flat against the flat portion 1a of the bracket, as in Fig. 1, but tends to arch over the same, due to the pressure of the spring clip at each side thereof, the clip itself in some cases being also arched as shown in Fig. 3.

Figure 4:
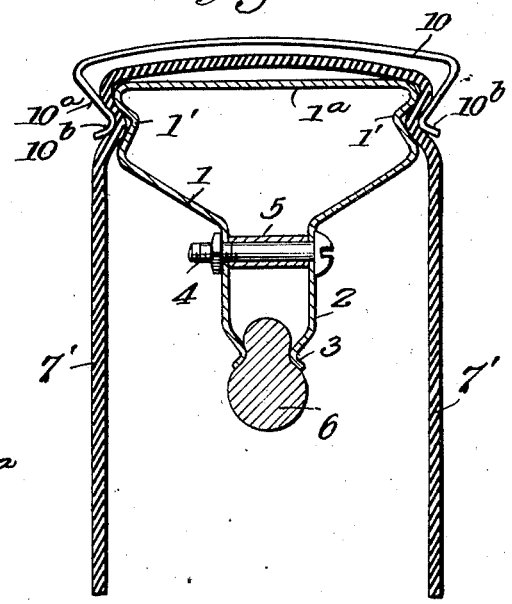
Fig. 4 is a view similar to Fig. 3, illustrating a slightly modified construction of fastening means, parts being broken away.
Figure 4:
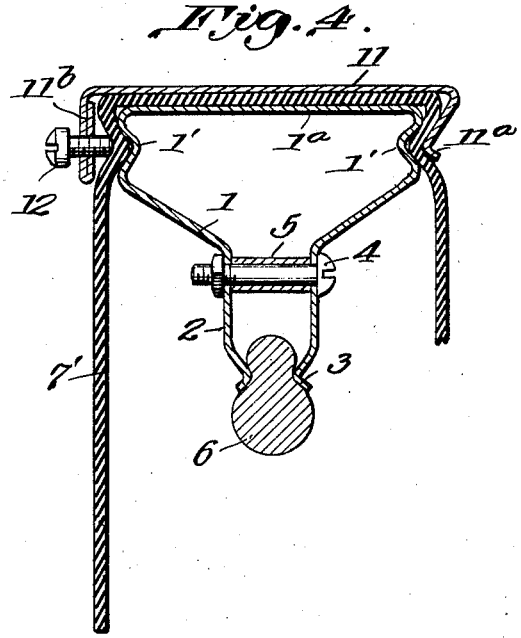

In Fig. 4 I have shown a slightly different construction of clip. In this case, the clip is indicated at 11 and is provided at one end only with an inwardly inclined portion having an outturned end 11a. At this end of the clip, the guard is confined between the portion 11a and the channel 1' of the bracket, as in Fig. 3. The end portion of the other end of the clip, however, extends at right angles to the body of the clip and is preferably bent back upon itself to form a portion of double thickness as illustrated at 11b. A set screw 12 is threaded through this portion 11b and bears at its inner end against the guard forcing it into the groove 1'.

With this type of construction, the main body of the clip may assume a relatively straight form as illustrated in Fig. 4, and the central portion of the guard may lie flat against the upper portion 1a of the loop of the bracket, the guard being confined between the bracket and the clip.

Figure 5:
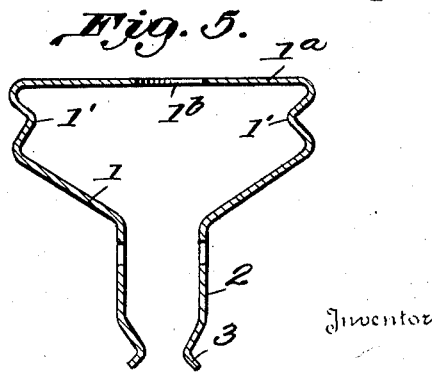
Fig. 5 is a similar sectional view showing the bracket itself, in its preferred form.

While, if using a guard of the type shown in Fig. 1, no channels at the sides of the bracket are required, and while when using a guard of the type shown in Figs. 3 and 4, and employing a clip of the kind illustrated in these figures, no hole or opening 1b, such as shown in Fig. 1, is required, I find it expedient in the commercial production of the bracket to manufacture it with both the channels 1' and the hole or opening 1b, as shown in Fig. 5. Thus, a standard type of bracket can be produced which is capable of universal application, regardless of the particular type of sheet or guard which is employed, or the particular type of securing means which may be used. If the brackets are to be employed in connection with guards of the Groendyk type, then a pin or stud can be passed through the opening 1b, as described in connection with Fig. 1. If, on the other hand, the bracket is to be used with sheeting or guards of the type shown in Figs. 3 and 4, then the clips will be employed to clamp the guard between themselves and the channels in the sides of the bracket. Thus the presence of the channels, if the bracket is used in the manner shown in Fig. 1, will not be objectionable, and similarly, the presence of the hole 1b, if the brackets are used as in Figs. 3 and 4, will have no effect. Consequently, the same bracket, as illustrated in Fig. 5, may be used in connection with any of the three securing means illustrated in the drawing.

What I claim is:

1. A bracket for supporting a trolley wire guard comprising a sheet metal band shaped to form a loop with the free ends adjacent, and means for clamping such free ends to a trolley wire, the middle portion of said loop being flat and relatively wide as compared with the width of the trolley wire, the loop, at either side of said flat portion, having a reentrant portion forming an external channel.

2. A bracket for supporting on a trolley wire a guard of flexible sheet material, said bracket having means whereby it may be mounted on the wire in a position extending upwardly therefrom, and having at each side of its upper portion a substantially horizontal channel, and a clip adapted to fit over said bracket and having means to cooperate with said channels to secure the guard in position.

3. The combination with a trolley wire, of a bracket mounted thereon and positioned above the same, and a guard of flexible, sheet material having its middle portion resting upon and supported by said bracket and its free edges depending therefrom to a point below said wire, said bracket having at each side a substantially horizontal channel, and a clip fitting over the guard material and bracket and having means at its ends for pressing said material into said channels, to secure the same in position.

4. The combination with a trolley wire, of a bracket mounted thereon and positioned above the same, and a guard of flexible, sheet material having its middle portion resting upon and supported by said bracket and its free edges depending therefrom to a point below said wire, and a clip fitting over the guard material and bracket, and clamping said material between itself and said bracket, to secure the guard in position.

5. Means for mounting on a trolley wire a guard of flexible sheet material, said means comprising a bracket adapted to support such material and having top and side portions with straight meeting edges, means for clamping said bracket to a trolley wire, and a clip fitting over the bracket and around the said edges thereof, and adapted to grip the flexible guard material between itself and said edges.

6. The combination with a trolley wire, of a bracket mounted thereon, said bracket comprising top and side portions having straight meeting edges, a guard of flexible sheet material having its middle portion resting upon and supported by the top of said bracket, and its marginal portions draped over said edges and depending therefrom, and a clip fitting over the guard material and bracket and gripping said material between itself and said edges.

7. In combination, a trolley wire guard comprising a thin flexible sheet of insulating material suspended around a trolley wire which is supported from conventional hangers, a bracket of thin sheet metal having means whereby it may be mounted on and supported by said wire in a position extending upwardly therefrom for supporting the guard between hangers, and comprising top and side portions with straight meeting edges parallel to said trolley wire, said top portion providing a surface on which the flexible sheet material guard member may rest, and means for securing said guard in place.

8. In combination, a trolley wire guard comprising a thin flexible sheet of insulating material suspended around a trolley wire which is supported from conventional hangers, a bracket of thin sheet metal having means whereby it may be mounted on and supported by said wire in a position extending upwardly therefrom for supporting the guard between hangers, and comprising top and side portions with straight meeting edges parallel to said trolley wire, said top portion providing a surface on which the flexible sheet material guard member may rest, said guard and bracket having aligned openings therein and a pin of insulating material passing through said openings to secure the guard in position.

9. In combination, a trolley wire guard comprising a thin flexible sheet of insulating material suspended around a trolley wire which is supported from conventional hangers, a thin sheet metal bracket mounted on and supported by said trolley wire in a position extending upwardly therefrom for supporting said guard between hangers, said bracket comprising top and side portions with straight meeting edges parallel to said trolley wire, said guard resting upon and supported by the top of said bracket and its free edges depending therefrom to a point below said trolley wire, the upper portion of said bracket being relatively wide as compared with the width of the trolley wire, whereby said sheet material may bend readily about said straight edges and the said depending free edges of the guard are spaced laterally a substantial distance from said wire, and means for securing said guard in place.

10 In combination, a trolley wire guard comprising a thin flexible sheet of insulating material suspended around a trolley wire which is supported from conventional hangers, a thin sheet metal bracket mounted on and supported by said trolley wire in a position extending upwardly therefrom for supporting said guard between hangers, said bracket comprising a thin sheet metal band shaped to form a loop having top and side portions with straight meeting edges parallel to said trolley wire, the top portion of said loop being relatively wide as compared with the width of the trolley wire and said side portions having inwardly converging inclined portions terminating in a pair of downwardly extending substantially parallel arms adapted to engage said trolley wire at their free ends, means for clamping said parallel arms about said wire extending through said arms at a point below said inclined portions, and means associated with said bracket for securing the guard thereto.

11. In combination, a trolley wire guard comprising a thin flexible sheet of insulating material suspended around a trolley wire which is supported from conventional hangers, a thin sheet metal bracket mounted on and supported by said trolley wire in a position extending upwardly therefrom for supporting said guard between hangers, said bracket comprising a thin sheet metal band shaped to form a loop having top and side portions with straight meeting edges parallel to said trolley wire, the middle portion of said loop being relatively wide as compared with the width of the trolley wire, and said side portions having inwardly converging inclined portions terminating in a pair of downwardly extending substantially parallel arms, said arms being spaced apart a distance approximately equal to the width of the trolley wire and having their free ends adapted to engage such wire, means for clamping said parallel arms about said wire extending through said arms at a point below said inclined portions, said guard and bracket having aligned openings therein and a pin of insulating material passing through said openings to secure the guard in position.

DARWIN A. ENSIGN.